United States Patent [19]

Bourke et al.

[11] Patent Number: 4,834,136
[45] Date of Patent: May 30, 1989

[54] PRESSURE RELIEF FILTER AND VALVE AND CRYOPUMP UTILIZING THE SAME

[75] Inventors: Edward L. Bourke, Boxboro; James E. Cartwright, Bellingham, both of Mass.

[73] Assignee: Helix Technology Corporation, Waltham, Mass.

[21] Appl. No.: 105,179

[22] Filed: Oct. 5, 1987

Related U.S. Application Data

[63] Continuation of Ser. No. 693,128, Jan. 22, 1985, Pat. No. 4,697,617.

[51] Int. Cl.[4] ............................................. F16K 15/00
[52] U.S. Cl. .................................. 137/549; 137/541; 137/542; 62/55.5
[58] Field of Search ............... 137/549, 541, 542, 565; 210/131, 510.1; 62/55.5; 417/901

[56] References Cited

U.S. PATENT DOCUMENTS

| 144,844 | 11/1973 | Gould et al. | 137/541 |
|---|---|---|---|
| 2,072,271 | 3/1937 | Meadows | 137/541 |
| 2,088,226 | 7/1937 | Arvintz | 137/542 |
| 2,532,568 | 12/1950 | Myers | 137/139 |
| 3,131,718 | 5/1964 | Mingrone | 137/541 |
| 3,847,819 | 11/1974 | Firth | 210/131 |
| 4,081,171 | 3/1978 | Morgan et al. | 137/549 |
| 4,256,470 | 3/1981 | Zajicek et al. | 210/510.1 |
| 4,360,037 | 11/1982 | Kendall | 137/549 |
| 4,454,722 | 6/1984 | Bartlett et al. | 417/901 |
| 4,459,208 | 7/1984 | Lemon | 210/131 |
| 4,478,617 | 10/1984 | Rees | 137/549 |
| 4,719,938 | 1/1988 | Pandorf | 417/901 |

FOREIGN PATENT DOCUMENTS

| 558462 | 4/1973 | Switzerland | 137/541 |
|---|---|---|---|
| 486602 | 6/1938 | United Kingdom | 210/131 |

Primary Examiner—A. Michael Chambers
Attorney, Agent, or Firm—Hamilton, Brook, Smith & Reynolds

[57] ABSTRACT

A pressure relief valve in a cryopump is preceded by a filter element in a filter housing. The filter element is springloaded so that the filter element itself provides pressure relief with clogging of the filter. The housing may have a removable end cap. The filter is spring biased by a spring between the housing end cap and a filter end cap.

10 Claims, 3 Drawing Sheets

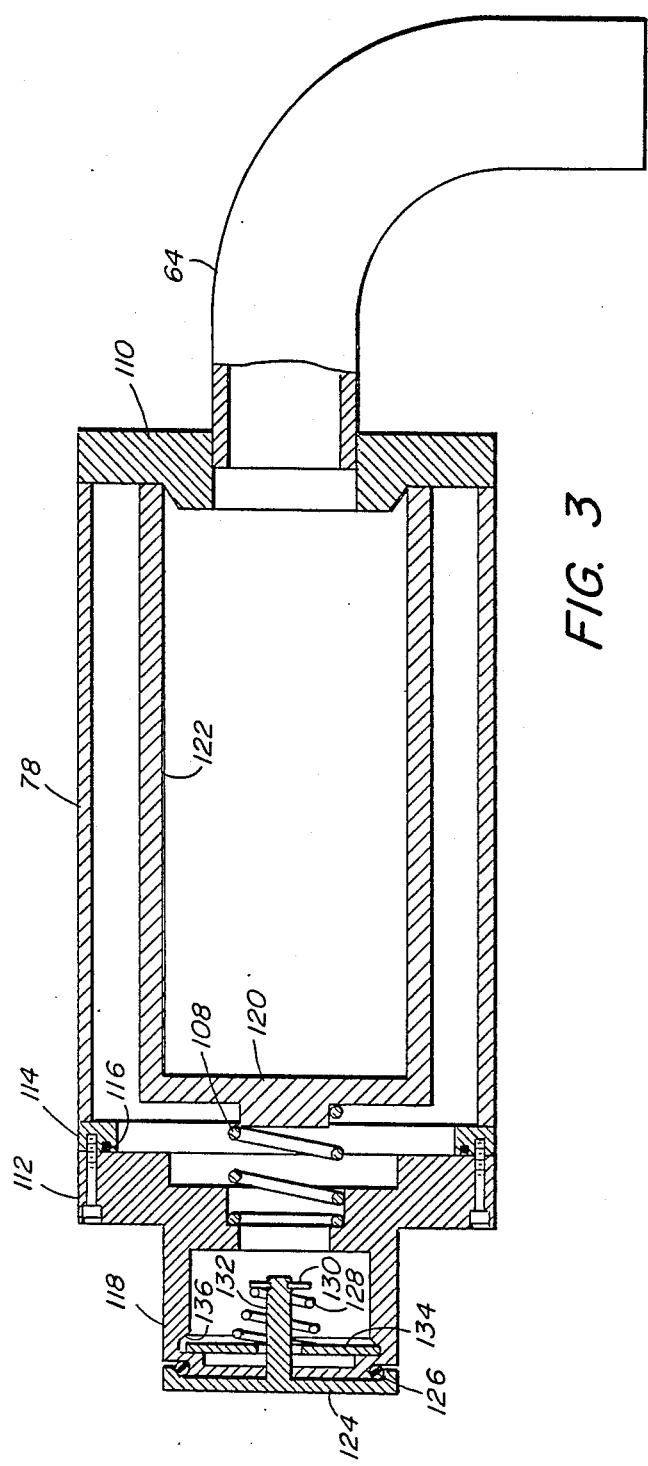

PRESSURE RELIEF FILTER AND VALVE AND CRYOPUMP UTILIZING THE SAME

This application is a continuation of application Ser. No. 693,128, filed Jan. 22, 1985 now U.S. Pat. No. 4,697,617.

BACKGROUND

Cryopumps currently available, whether cooled by open or closed cryogenic cycles, generally follow the same design concept. A low temperature array, usually operating in the range of 4 to 25 K, is the primary pumping surface. This surface is surrounded by a higher temperature radiation shield, usually operated in the temperature range of 70 to 130 K, which provides radiation shielding to the lower temperature array. The radiation shield generally comprises a housing which is closed except at a frontal array positioned between the primary pumping surface and the chamber to be evacuated. This higher temperature, first stage frontal array serves as a pumping site for higher boiling point gases such as water vapor.

In operation, high boiling point gases such as water vapor are condensed on the frontal array. Lower boiling point gases pass through that array and into the volume within the radiation shield and condense on the lower temperature array. A surface coated with an adsorbent such as charcoal or a molecular sieve operating at or below the temperature of the colder array may also be provided in this volume to remove the very low boiling point gases such as hydrogen. With the gases thus condensed and/or absorbed onto the pumping surfaces, only a vacuum remains in the work chamber.

Once the high vacuum has been established, work pieces may be moved into and out of the work chamber through partially evacuated load locks. With each opening of the work chamber to the load lock, additional gases enter the work chamber. Those gases are then condensed onto the cryopanels to again evacuate the chamber and provide the necessary low pressures for processing. After continued processing, perhaps over several weeks, gases condensed or adsorbed on the cryopanels would have a volume at ambient temperature and pressure which substantially exceeds the volume of the cryopump chamber. If the cryopump shuts down, that large volume of captured gases is released into the cryopump chamber. To avoid dangerously high pressures in the cryopump with the release of the captured gases a pressure relief valve is provided. Typically, the pressure relief valve is a springloaded valve which opens when the pressure in the cryopump chamber exceeds about 3 pounds per square inch gauge. Because the process gases may be toxic, the pressure relief valve is often enclosed within a housing which directs the gases through an exhaust conduit.

After several days or weeks of use, the gases which have condensed onto the cryopanels and, in particular, the gases which are adsorbed begin to saturate the system. A regeneration procedure must then be followed to warm the cryopump and thus release the gases and to remove the gases from the system. As the gases are released, the pressure in the cryopump increases and the gases are exhausted through the pressure relief valve.

A typical pressure relief valve includes a cap which, when the valve is closed, is held against an o-ring seal by a spring. With pressures which open the valve, the cap is pushed away from the o-ring seal and the exhausted gases flow past the seal. Along with the gas, debris such as particles of charcoal from the adsorber or other debris resulting from processing within the work chamber also pass the seal. That debris often collects on the o-ring seal and the closure cap. In order to effect a tight vacuum after regeneration it is often necessary to clean the relief valve after each regeneration procedure. If such care is not taken, leaks into the cryopump result at the relief valve and provide an undesired load on the cryopump.

DISCLOSURE OF THE INVENTION

In accordance with principles of the present invention, the pressure relief valve of a cryopump is preceded by a filter which collects debris which might otherwise contaminate the pressure relief valve. Thus, gases released from the cryopump chamber through the pressure relief valve first pass through the filter. Means is provided for bypassing the filter element if a pressure differential above a predetermined level develops across the filter element due to clogging of the element with debris.

The specific filter assembly includes a cylindrical housing with an inlet at one end in communication with the cryopump chamber and an outlet at the opposite end at which a pressure relief valve is mounted. A cylindrical filter is open at one end to the inlet to the housing and is closed at the opposite end by a cap. The filter cap and thus the filter cylinder are spring biased toward the inlet. Preferably, the filter cylinder is of sintered filter material.

Threaded holes may be provided in the end of the housing adjacent to the pressure relief valve for mounting of an exhaust tube which captures the exhausted gases. The end of the housing may be removable to allow for replacement of the filter element.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a longitudinal cross-sectional view of an alternative filter and relief valve assembly.

DESCRIPTION OF PREFERRED EMBODIMENTS

Figure 1:
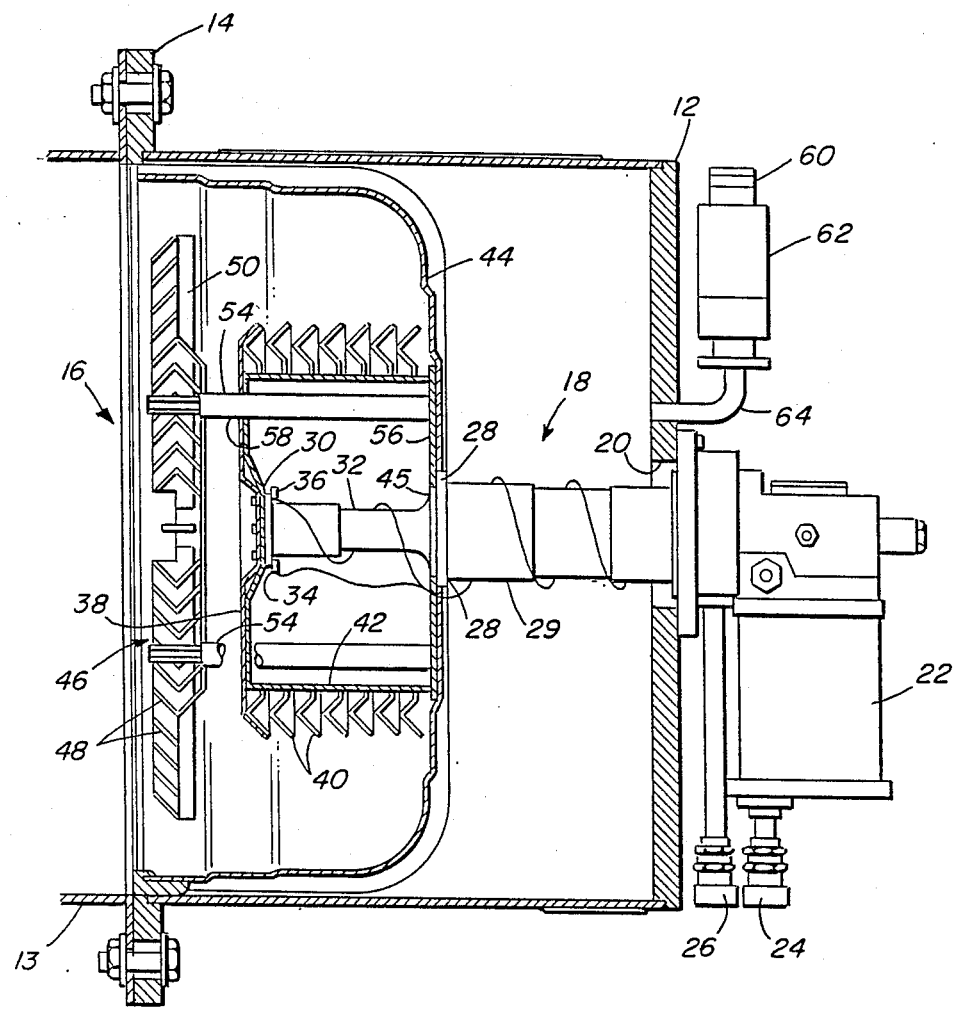
FIG. 1 is a cross-sectional view of a cryopump embodying the present invention.

The cryopump of FIG. 1 comprises a main housing 12 which is mounted to a work chamber or a valve housing 13 along a flange 14. A front opening 16 in the cryopump housing 12 communicates with a circular opening in the work chamber or valve housing. Alternatively, the cryopump arrays may protrude into the chamber and a vacuum seal be made at a rear flange. A two stage cold finger 18 of a refrigerator protrudes into the housing 12 through an opening 20. In this case, the refrigerator is a Gifford-MacMahon refrigerator but others may be used. A two stage displacer in the cold finger 18 is driven by a motor 22. With each cycle, helium gas introduced into the cold finger under pressure through line 24 is expanded and thus cooled and then exhausted through line 26. Such a refrigerator is disclosed in U. S. Pat. No. 3,218,815 to Chellis et al. A first stage heat sink, or heat station 28 is mounted at the cold end of the first stage 29 of the refrigerator. Similarly, a heat sink 30 is mounted to the cold end of the second stage 32. Suitable temperature sensor and vapor pressure sensor elements 34 and 36 are mounted to the rear of the heat sink 30.

The primary pumping surface is a cryopanel array mounted to the heat sink 30. This array comprises a disc 38 and a set of circular chevrons 40 arranged in a vertical array and mounted to disc 38. The cylindrical surface 42 holds a low temperature absorbent such as charcoal. Access to this absorbent by low boiling point gases is through chevrons 40.

A cup shaped radiation shield 44 is mounted to the first stage, high temperature heat sink 28. The second stage of the cold finger extends through an opening 45 in that radiation shield. This radiation shield 44 surrounds the primary cryopanel array to the rear and sides to minimize heating of the primary cryopanel array by radiation. The temperature of this radiation shield ranges from about 100° K. at the heat sink 28 to about 130° K. adjacent to the opening 16.

A frontal cryopanel array 46 serves as both a radiation shield for the primary cryopanel array and as a cryopumping surface for higher boiling temperature gases such as water vapor. This panel comprises a circular array of concentric louvers and chevrons 48 joined by spoke-like plates 50. The configuration of this cryopanel 46 need not be confined to circular concentric components; but it should be so arranged as to act as a radiant heat shield and a higher temperature cryopumping panel while providing a path for lower boiling temperature gases to the primary cryopanel.

Thermal struts 54 extend between a plate 56 mounted to the heat sink 28 and the frontal array. Those struts extend through clearance openings 58 in the primary panel 38 and are thus isolated from that panel.

In a typical system, the cryopump is regenerated by turning off the refrigerator and allowing the system to warm. As the temperature of the system increases the gases are released, thus increasing the pressure in the system. As the pressure reaches about 3 PSIG the released gases are exhausted from the system through a relief valve 60.

The pressure relief valve 60 may be of conventional design, but in accordance with the present invention it is preceded by a filter assembly 62. The filter assembly 62 is mounted to an exhaust conduit 64 typically provided on cyropump housings. In FIG. 1 the conduit 64 is shown as being directed away from the helium lines 24 and 26, but in some systems the conduit is directed parallel to the lines 24 and 26. The filter assembly 62 and relief valve 60 are dimensioned to fit in the latter systems in the space alongside the motor 22 such that they do not extend beyond the cylindrical envelope defined by the cryopump housing.

Figure 2:
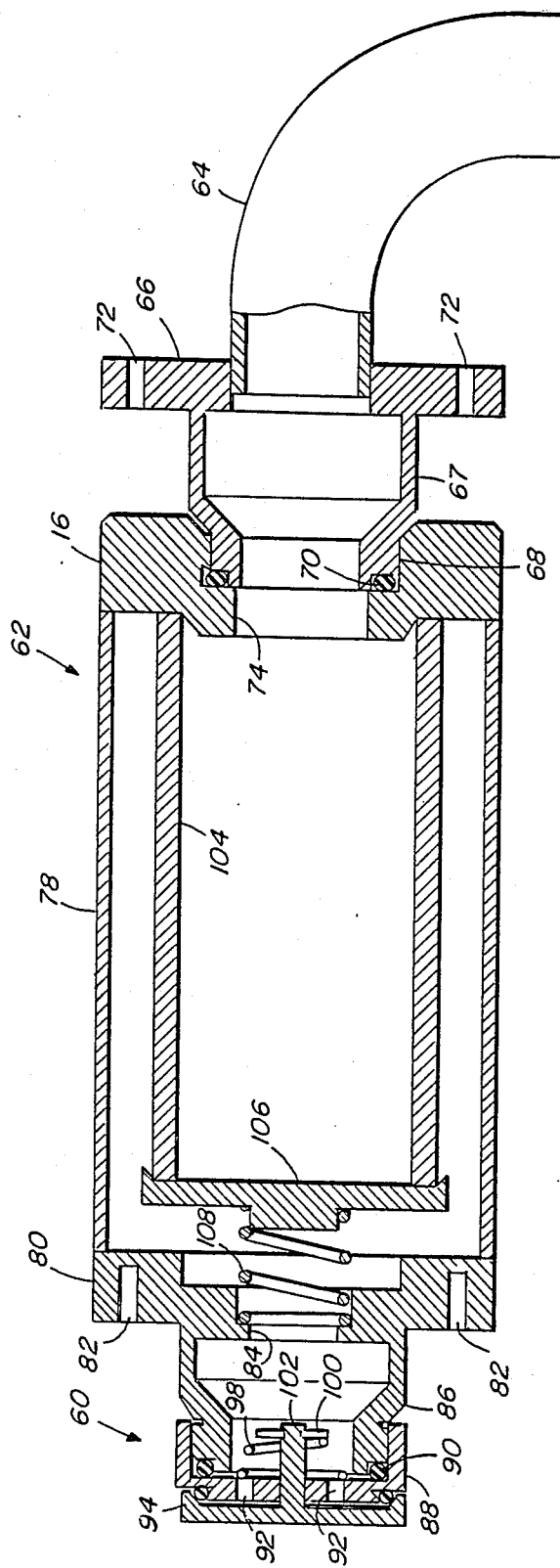
FIG. 2 is a longitudinal cross-sectional view of the filter and relief valve assembly in the system of FIG. 1.

Details of the filter assembly 62 and pressure relief valve 60 are illustrated in FIG. 2. The elbow 64 typically includes a flange assembly 66 at its end for mounting of a pressure relief valve 60. The assembly 66 includes a valve mount 67 having an externally threaded neck 68. In conventional systems the relief valve 60 is typically threaded onto the mount 67 with an o-ring 70 providing a static seal. Holes 72 are provided in the flange for mounting of an exhaust housing which directs the gases through an exhaust conduit away from the system.

In the present system, the filter assembly 62, having an internally threaded bore at the inlet 74 is mounted to the valve mount 67 with the o-ring static seal 70. The inlet is formed in an end cap 76 which is welded to a cylindrical housing 78. The cylindrical housing 78 is closed at the left end, as viewed in FIG. 2, by a cap 80. The cap 80 has threaded bolt holes 82 which match those of the flange assembly 66 for mounting an exhaust housing. An outlet port 84 provided in the end cap 80 leads into a relief valve mount 86 which, in this case, is identical to that on the flange 66.

The pressure relief valve which is threaded onto the mount 86 includes a cap 88. A static seal is provided by an o-ring 90. Gas ports 92 are provided for free flow of gas through the cap 88. The cap 88 is closed by a closure 94 which is held against an o-ring seal 96 by a compression spring 98. The compression spring 98 is retained by a clip 100 mounted to the end of a stem 102 extending from the closure 94.

It can be seen that the closure 94 is retained against the o-ring 96 by the spring 98 and by atmospheric pressure when a vacuum is drawn in the cryopump. The spring 98 applies a closing force to the closure 94 which can be overcome by a pressure in the mount 86 which is about 3 psi above atmosphere.

In accordance with the present invention, a filter element including a cylinder 104 and a filter end cap 106 is provided between the cryopump and the relief valve. Preferably, the filter elements are of sintered material and the preferred element is a 50 micron filter of sintered 316L stainless steel. Such filters are corrosion resistant and structurally rigid and their filtering characteristics are well defined in the filter industry. Although shown as two pieces, which may be welded together, the cylinder 104 and end cap 106 may be a single casted part. The filter element is selected to pass fluids which are exhausted from the cryopump chamber. Those fluids may include cryogens which are saturated liquid. If the cryogens did not pass through the filter they might temporarily clog the filter element even when the filter element was not clogged with debris. The result would be temporary bypassing of the filter element which would allow the debris to pass through the relief valve and thus defeat the purpose of the filter element.

The filter element is held against the inlet cap 76 of the filter housing by a compression spring 108 which presses against the outlet cap 80. During usual operation of the system, gas from the cryopump chamber is free to flow through the filter and the pressure buildup in the cryopump chamber is seen by the pressure relief valve. However, after continued use, the filter may become clogged with debris. If the filter element were fixed, a dangerously high pressure might result in the cryopump chamber. To avoid such pressure buildup, the spring 108 is selected to release the filter element when the pressure differential across the filter cap 106 exceeds about 3 psi. With such a pressure differential due to clogging of the filter, the cap 106 moves to the left against the spring 108 pulling the cylinder 104 from the inlet cap 76 of the housing. Gases are then free to flow about the right end of the filter cylinder 104 through the annulus about the filter cylinder and out the outlet port 84 and the pressure relief valve 60.

The cylindrical design of the filter element allows for a large filter area across the gas flow path while permitting the filter assembly to be of dimensions for convenient positioning adjacent to the motor 22 on the elbow 64. The annulus between the filter and the housing cylinder 78 and the lengths of the filter and housing cylinders are dimensioned to provide a hydraulic drameter throughout the flow path bypassing the filter element which is greater than that of the relief valve 60.

An alternative embodiment of the filter and relief valve assembly is illustrated in FIG. 3. In this assembly, the filter housing cylinder 78 is welded directly to a flange 110 which is welded to the elbow 64. Thus, the seal 70 which might be a source of leakage is avoided. Because the entire filter assembly is no longer removable from the system, the filter element within the cylinder must be separately replaceable. To that end the outlet end of the housing is closed by an end cap 112 which is bolted to a flange 114 welded to the cylinder 78. An o-ring 116 provides a static seal. To avoid an additional o-ring seal, the fixed portion of the relief valve 118 is formed integrally with the end cap 112. As in the previous embodiment, the filter element is spring biased by a compression spring 108 between the filter element and the end cap 112. However, in this embodiment the filter element is shown as a single sintered element in which the end cap 120 is cast with the cylinder 122.

The relief valve closure 124 is initially pulled against the o-ring 126 by a compression spring 128 which is positioned between an end clip 130 on the stem 132 and a retainer 134. The retainer is a spider clip which may be positioned within the groove 136 to retain the compression spring 128 yet allow free flow of fluid.

The embodiment of FIG. 2 with its complementary threads at each end thereof is readily retrofitted to cryopump equipment. It also allows for disposal of the entire filter assembly without requiring contact with the filter element which may hold toxic materials. The embodiment of FIG. 3, on the other hand, allows for a minimum of o-ring seals and replacement of the filter element alone.

While the invention has been particularly shown and described with reference to preferred embodiments thereof, it will be understood by those skilled in the art that various changes in form and details may be made therein without departing from the spirit and scope of the invention as defined by the appended claims.

We claim:

1. A cryopump having a pressure relief mechanism, the mechanism comprising:
   a filter element in fluid communication with a cryopump chamber, the filter element being permeable to fluid from the cryopump chamber;
   filter bypass means for bypassing the filter element with a pressure differential across the filter element above a predetermined level; and
   a pressure relief valve receiving filtered fluid from the filter element, such that the valve is in fluid communication with the cryopump chamber through the filter element for releasing filtered fluid from the cryopump chamber when the pressure in the chamber exceeds a predetermined level.

2. A cryopump as claimed in claim 1 wherein the filter element has a cylindrical housing and has an end cap, the end cap being spring biased toward an inlet to the filter element such that the filter element presses against the spring away from the inlet with a predetermined pressure differential across the filter element.

3. A cryopump as claimed in claim 2 wherein the filter element is of sintered material.

4. A cryopump as claimed in claim 2 wherein the filter housing comprises means for coupling an exhaust housing about the pressure relief valve.

5. A cryopump as claimed in claim 1 wherein the filter element has a housing which has internal threads at its inlet end for mounting to an exhaust conduit and external threads, complimentary to the internal threads, at an outlet end of the housing for mounting of a pressure relief valve.

6. A cryopump as claimed in claim 1 wherein the filter element is positioned in a housing having a removable end cap and a spring is positioned between the housing end cap and an end cap of the filter element.

7. A method of relieving pressure in a cryopump comprising providing a filter element in fluid communication with a cryopump chamber and a pressure relief valve for receiving filtered fluid from the filter element, such that the valve is in fluid communication with the cryopump chamber through the filter element, releasing fluid from the cryopump chamber through the filter and pressure relief valve when the pressure in the chamber exceeds a predetermined level, and bypassing the filter element when the pressure differential across the filter element exceeds a predetermined level.

8. A method as claimed in claim 7 wherein the filter element is cylindrical and has an end cap, the endcap being spring biased toward an inlet to the filter such that the filter element presses against the spring away from the inlet with a predetermined pressure differential across the filter element.

9. A method as claimed in claim 8 wherein the filter element is of sintered material.

10. A method as claimed in claim 7 wherein the filter element is positioned in a housing having a removable end cap and a spring is positioned between the housing end cap and an end cap of the filter element.

* * * * *